United States Patent [19]

Baer

[11] 4,375,532
[45] * Mar. 1, 1983

[54] MULTIPHASE CORE/SHELL POLYMERS

[75] Inventor: Massimo Baer, Longmeadow, Mass.

[73] Assignee: Monsanto Company, St. Louis, Mo.

[ * ] Notice: The portion of the term of this patent subsequent to Dec. 15, 1998, has been disclaimed.

[21] Appl. No.: 306,972

[22] Filed: Aug. 30, 1981

Related U.S. Application Data

[63] Continuation-in-part of Ser. No. 202,957, Nov. 3, 1980, Pat. No. 4,306,040.

[51] Int. Cl.³ .................. C08F 279/02; C08F 255/06; C08F 291/02
[52] U.S. Cl. ..................................... 525/310; 525/304; 525/305; 525/309; 525/440; 525/454; 524/504; 428/407
[58] Field of Search ............... 525/301, 304, 310, 440, 525/454, 309

[56] References Cited

U.S. PATENT DOCUMENTS

| | | | |
|---|---|---|---|
| 3,984,497 | 10/1976 | Owens et al. | 525/310 |
| 4,221,879 | 9/1980 | Humme et al. | 525/66 |
| 4,306,040 | 12/1981 | Baer | 525/310 |

FOREIGN PATENT DOCUMENTS 2906222  8/1980  Fed. Rep. of Germany.

*Primary Examiner*—Carman J. Seccuro
*Attorney, Agent, or Firm*—R. Bruce Blance; William J. Farrington; Paul D. Matukaitis

[57] ABSTRACT

A multiphase core//shell polymer comprising a crosslinked elastomer core and a rigid thermoplastic polymer shell comprising a mono alkyl maleate or fumarate, styrene and optionally a monomer selected from the group consisting of $C_1$ to $C_8$ alkyl acrylates and methacrylates, acrylonitrile and methacrylonitrile. The core has an average particle diameter in the range of about 0.3 to about 0.8 micron and the rigid shell has a thickness of at least about 0.025 micron. The multiphase core//shell polymers are useful for blending with polyamides to provided toughened polyamide compositions.

4 Claims, No Drawings

MULTIPHASE CORE/SHELL POLYMERS

This application is a continuation-in-part of application Ser. No. 202,957, filed Nov. 3, 1980, now U.S. Pat. No. 4,306,040.

BACKGROUND OF THE INVENTION

1. Field of the Invention

This invention relates to multiphase core//shell polymers and more particularly to multiphase core//shell polymers containing a rigid shell comprising styrene and a monoalkyl maleate or fumarate, used to enhance the impact resistance and ductility of polyamides.

2. Description of the Prior Art

There is much prior art concerned with improving the impact strength of polyamides. A variety of additives have been added to polyamides with some improvement in toughness being obtained. Many of the additives are elastomeric in nature. For example, Owens et al. U.S. Pat. No. 3,668,274 teaches modestly improved impact strength of polyamides modified with (A) a first cross-linked elastomer phase of copolymers or terpolymers and (B) a final rigid phase thermoplastic stage containing amine-reactive moieties, preferably carboxylic acid groups. The soft modifier is coated with a rigid layer thus apparently negating a large improvement in polyamide toughness.

Dunkelberger, U.S. Pat. No. 4,167,505, recognizes that the polymer modifiers of Owens et al. impart improvement in the impact strength of higher molecular weight polyamides but that the resulting blends do not exhibit the good flow necessary for injection molding operations and teaches that Owens' core//shell polymers having high rubber core content are not capable of being admixed and dispersed in low molecular weight nylon due to the very low viscosity of nylon above the melting point and the resulting difficulty of dispersing a viscous component in a fluid medium due to insufficient shear.

Another approach to the problem of enhancing the toughness of polyamides is provided by Epstein, U.S. Pat. No. 4,174,358. Toughened multiphase polyamides were obtained by incorporating elastomers modified by copolymerization or reaction with monomers containing functional groups such as carboxy groups capable of reaction or hydrogen-bonding with polyamides. This approach has been used with acrylates, polyethylenes, ethylene propylene rubbers, ethylene propylene diene rubbers and ethylene vinyl acetate copolymers. The resulting functionalized bulk rubbers or elastomers require very intensive shear in order to be finely dispersed in a polyamide matrix. The rubbers must, therefore, be soluble (i.e., not crosslinked) in order to permit flow and dispersion on heating. Since the rubber particles are soluble and deformable, their final size is largely dependent on intensity of shear on extrusion and molding. The desired fine rubber dispersions are difficult to obtain without intensive shear, and control of rubber particle size in the final molding is not easily obtained.

Humme et al, U.S. Pat. No. 4,221,879, discloses impact-resistant polyamides consisting substantially of a polyamide and a graft product of a polybutadiene as a graft substrate and a mixture of an acrylate or methacrylate, and acrylonitrile and/or acrylamide monomers grafted thereon. The grafted shell is generally elastomeric in nature. Graft products containing a rigid shell such as a styrene copolymer shell are found to be unsatisfactory apparently because of poor compatibility with the polyamide.

SUMMARY OF THE INVENTION

According to this invention, there is provided a multiphase core//shell polymer comprising 50 to 90 parts by weight of a crosslinked elastomer core and 10 to 50 parts by weight of a rigid thermoplastic polymer shell of glass transition temperature of at least about 35° C. containing from about 1 to about 25 parts by weight of an interpolymerized $C_1$ to $C_4$ monoalkyl maleate or fumarate, from about 20 to about 80 parts by weight of interpolymerized polystyrene, from about 0 to about 79 parts by weight of a $C_1$ to $C_8$ alkyl acrylate or methacrylate and from about 0 to about 45 parts by weight of interpolymerized acrylonitrile or methacrylonitrile based on 100 parts by weight of shell polymer wherein the core of the polymer has a weight average particle diameter in the range of about 0.3 to about 0.8 micron and the rigid shell has a thickness of at least about 0.025 micron.

The multiphase core//shell polymers are used for toughening polyamides.

DETAILED DESCRIPTION OF THE INVENTION

The polyamide resins which are toughened by the multiphase core//shell compositions of this invention, are well known in the art and embrace those semicrystalline and amorphous resins having a number average molecular weight in the range of about 5000 to 30,000 commonly referred to as nylons. Preferably the molecular weight is in the range of about 8,000 to 20,000. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelamide (69 nylon), polyhexamethylene sebacamide (610 nylon), polyhexamethylene dodecanoamide (612 nylon) and bis (paraaminocyclohexyl) methane dodecanoamide. The polyamide resin can also be produced by ring opening of lactams, for example polycaprolactam and polylauric lactam, and by condensation of $\omega$-amino-carboxylic acids, for example, poly-11-aminoundecanoic acid. It is also possible to use in this invention polyamides prepared by the copolymerization of two of the above polymers or terpolymerization of the above polymers or their components, e.g., for example, an adipic, isophthalic acid hexamethylene diamine copolymer. Preferably the polyamides are linear with a melting point in excess of 200° C. As great as 99 percent by weight of the composition can be composed of polyamide; however, preferred compositions contain from 55 to 99 percent, and more narrowly 65 to 90 percent, by weight of polyamide.

The molecular weight of the polyamide is selected in the range of 5000 to 30,000 number average, preferably 8000 to 20,000 to provide polyamide compositions which can be readily molded by injection or extrusion techniques.

The multiphase core//shell polymer of the present invention is an elastomer based composite interpolymer material having a crosslinked elastomer core and a rigid thermoplastic polymer shell.

The elastomer core can be a diene elastomer, an ethylene-propylene-diene rubber, an acrylic elstomer, or a polyurethane elastomer. The diene elastomers include polybutadiene, polyisoprene, polychloroprene and poly(cyanobutadiene). The diene may be copolymerized with up to about 50 weight percent of other monomers such as alkyl acrylates and methacrylates, styrene, α-methylstyrene, acrylonitrile and substituted acrylonitriles, vinyl ethers, vinyl amides, vinyl esters and the like.

The acrylic elastomers comprise 50 to 99.9 parts by weight of an alkyl acrylate containing 1 to 10 carbon atoms, preferably 2 to 8 carbon atoms, 0 to 40 parts by weight of other ethylenically unsaturated monomers and 0.1 to 5 parts by weight of a polyunsaturated crosslinking monomer such as polyacrylic and polymethacrylic esters of polyols such as butylene diacrylate and dimethacrylate, trimethylolpropane, trimethacrylate, and the like, vinyl acrylate and methacrylate, divinyl and trivinyl benzene and the like. Optionally from about 0.1 to about 5 parts by weight of a graft-linking monomer with two or more addition polymerizable unsaturated groups which participate in polymerization at different rates, may also be included. It is preferred that the graft-linking monomer has at least one reactive group which polymerizes at about the same rate, or slightly slower than the other monomers, while the remaining reactive group or groups polymerize at a substantially slower rate. The differential polymerization rates result in a residual level of unsaturation in the elastomer core, particularly during the latter stages of polymerization and, consequently, at or near the surface of the elastomer particles. When the rigid thermoplastic shell is subsequently polymerized at the surface of the elastomer, the residual unsaturated addition-polymerizable reactive groups contributed by the graft-linking monomer participate in the subsequent reaction so that at least a portion of the rigid shell is chemically attached to the surface of the elastomer. The crosslinked elastomer core preferably has a glass transition temperature below about −25° C. and a swelling index ranging from about 2 to about 20 determined in a good "solvent" for the elastomer, i.e. a solvent which has a solubility parameter close to the solubility parameter of the polymer and is similar in polarity and hydrogen-bonding ability. Thus for polybutadienes, suitable solvents for determination of swelling index include benzene, toluene and tetrahydrofuran and for acrylic elastomers, suitable solvents include acetone, benzene and toluene.

The elastomeric core is prepared in bulk, in emulsion or in solution. Those prepared in bulk or solution are converted into aqueous emulsion by known techniques prior to the addition polymerization of the rigid polymer shell thereto.

The rigid thermoplastic polymer shell has a glass transition temperature of at least about 35° C. and comprises a monomaleate or monofumarate of a $C_1$ to $C_4$ alcohol, styrene, a $C_1$ to $C_8$ alkyl acrylate or methacrylate, and acrylonitrile or methacrylonitrile in weight ranges of from about 1 to about 25 parts by weight of $C_1$ to $C_4$ monoalkyl maleate or fumarate, from about 20 to about 80 parts by weight of styrene, from about 0 to about 79 parts by weight of acrylate or methacrylate and from about 0 to about 45 parts by weight of the acrylonitrile, based on 100 parts by weight of polymer shell.

The multiphase core//shell polymers are prepared by emulsion polymerization of the shell comonomers in the presence of an emulsion of the elastomer core by known techniques which favor the formation of rigid thermoplastic polymer shell around the elastomer core rather than discrete particles of rigid polymer separate from the core. The emulsion polymerization of the shell comonomers onto the elastomer core is preferably controlled to provide a degree of polymerization such that the apparent melt viscosity of the core//shell polymer determined, at a temperature 10° C. above the melting point of the polyamide with which it is to be blended and at a shear rate of 1000 sec.$^{-1}$, on polymer which has been coagulated from the emulsion and dried, is no more than about ten times the apparent melt viscosity of the polyamide and is preferably in the range of one to eight times the apparent melt viscosity of the polyamide. For nylon 6,6 compositions, the temperature for determination of apparent melt viscosity is 260° C. The degree of polymerization can be conveniently controlled by addition of an appropriate amount of a chain transfer agent such as a mercaptan, a polyhalogen compound or an allylic compound.

The elastomer core emulsion is preferably of weight average particle diameter of 0.3 micron or more and the thickness of the rigid polymer shell calculated from the weight added to the above elastomer, is preferably at least about 0.025 micron to prevent sintering of the core//shell particles upon coagulation and drying, and to facilitate formation of a uniform dispersion of the core//shell polymer in the polyamide. More preferably the particle diameter is in the range of about 0.3 to about 0.8 micron and even more preferably it is in the range of about 0.4 to about 0.7 micron so that the proportion of rigid polymer shell necessary to prevent agglomeration and sintering of the emulsion particles during the coagulation and drying step is minimized.

When the elastomer core comprises a butadiene polymer or an acrylic polymer prepared by emulsion polymerization, the particle size is generally in the range of about 0.1 to about 0.2 micron. Seeding techniques can provide emulsions of larger particle size. However, since emulsion polymerization conditions which favor the formation of large particle size, may cause a significant degree of coagulation of the elastomer core causing kettle fouling and detracting from the formation of fine, uniform dispersions of the multiphase core//shell polymer in the polyamide, it is generally preferred to form butadiene and acrylic elastomer core emulsions of large particle size in the range of about 0.3 to about 0.8 micron by controlled agglomeration of emulsions of 0.1 to 0.2 micron particle size. Agglomeration may be achieved by any conventional means such as by the addition of a suitable amount of water-soluble, carboxylic acid or anhydride of such acid. The agglomerated emulsion is then stabilized by addition of a suitable emulsifier.

The amount of elastomer core in the multiphase core//shell polymer may range from about 50 to about 90 parts by weight with about 10 to about 50 parts by weight of rigid polymer shell applied thereto. More preferably, the amount of elastomer core is in the range of about 60 to about 80 parts by weight and the amount of rigid polymer shell is in the range of about 20 to about 40 parts by weight.

Polymerization of the rigid polymer shell is carried out under conditions which favor polymerization at or onto the surface of the elastomer core emulsion so that no substantial number of new "seeds" or particles form in the emulsion. This is generally accomplished by controlling the rate of addition of monomer, emulsifier and initiator. Preferably no further emulsifier is added after formation of the core elastomer emulsion. When polymerization is substantially complete, the multiphase core//shell polymer is coagulated by any convenient method such as by freezing, by addition of a coagulating solvent such as methanol optionally containing a small amount of strong acid such as hydrochloric acid, or by addition of an aqueous solution of a polyvalent metal salt such as magnesium sulfate or aluminum sulfate. The coagulated emulsion is washed thoroughly with water to remove emulsifiers and salts and dried preferably at a temperature at least 10° C. below the glass transition temperature of the rigid polymer shell.

Blends of polyamide and multiphase core//shell polymer can be prepared by melt blending in a closed system at a temperature in the range of about 5° to about 100° C. above the melting point of the polyamide. Single or double screw extruders may be conveniently used for the blending process. Advantages of the present compositions lie in the ease with which they are blended with polyamides in a single screw extruder and the ease with which uniform submicron dispersions of the multiphase core//shell polymer in the polyamide are formed. It is believed that such effects can only be achieved if the latex particles obtained after graft polymerization of the rigid shell onto the elastomer core, are able to preserve their shape and size when redispersed in the polyamide by melt blending. For this to be achieved, the polymer crumb obtained by coagulation of the latex, should be able to break up into particles of essentially the same size and shape as the particles of the grafted latex. In other words, the crumb after drying must have sufficiently loose clusters to permit redispersion and this looseness is promoted by the rigid polymer shell which prevents the particles of elastomer from sintering into a solid mass.

The improvement in toughness of polyamides when they are blended with the multiphase core//shell polymers of the present invention in comparison with unblended polyamide is manifested by a higher notched Izod value and reduction in the percentage of brittle failure in a multiaxial driven dart test. The Izod value increases steadily with increase in the amount of elastomer core material in the polyamide blend and is in the range of 300 to 1000 J/m notch when the elastomer content is in the range of 12-18 weight percent of the composition. Thus values of 500 J/m notch are readily obtained. Quite modest concentrations of elastomer reduce the percentage of brittle failure of the polyamide in the multiaxial driven dart test and when the elastomer content is 10% by weight or more the percentage is reduced to 0. A considerable improvement in notched impact strength at low temperatures such as $-40°$ C. and lower is also observed.

The blends of multiphase core//shell polymer and polyamide may be modified by one or more conventional additives such as stabilizers and inhibitors of oxidative, thermal, and ultraviolet light degradation, lubricants and mold release agents, colorants, nucleating agents and plasticizers. Up to 50 weight percent of glass fiber or fibrous and particulate inorganic fillers can increase the modulus and resistance to heat distortion of the blends by a substantial degree.

The stabilizers can be incorporated into the blends at any stage in their preparation. Preferably the stabilizers are included early to preclude the initiation of degradation. Such stabilizers must be compatible with the blend. The oxidative and thermal stabilizers useful in the blends include those used in polyamides, elastomers, and addition polymers generally. They include, for example, Group I metal halides, e.g., sodium, potassium and lithium, with cuprous halides. e.g., chloride, bromide, iodide, and also hindered phenols, hydroquinones, phosphites and varieties of substituted members of those groups and combinations thereof. Ultraviolet light stabilizers, can include various substituted resorcinols, salicylates, benzotriazoles, benzophenones, and the like.

Suitable lubricants and mold release agents, are stearic acid, stearic alcohol, stearamides; organic dyes include nigrosine, etc.; suitable pigments include titanium dioxide, cadmium sulfide, cadmium sulfide selenide, phthalocyanines, ultramarine blue, carbon black, etc.; suitable fibrous and particulate fillers and reinforcements include carbon fibers, glass fibers, amorphous silica, asbestos, calcium silicate, aluminum silicate, magnesium carbonate, kaolin, chalk, powdered quartz, mica, feldspar, etc.; nucleating agents include talc, calcium fluoride, sodium phenyl phosphinate, alumina, and finely divided polytetrafluoroethylene, etc.; plasticizers, up to about 20 percent, based on the weight of the polyamide blend, include dioctyl phthalate, dibenzyl phthalate, butyl benzyl phthalate, hydrocarbon oils, N-normal butyl benzenesulfonamide, N-ethyl ortho- and para-toluenesulfonamide, etc.

The toughened polyamide blends can be made into a wide range of useful articles by conventional molding methods employed in the fabrication of thermoplastic articles, i.e., as molded parts and extruded shapes, such as tubing, films, sheets, fibers and oriented fibers, laminates and wire coating.

EXAMPLES OF THE INVENTION

The following examples illustrate the invention wherein parts and percentages are by weight unless otherwise indicated.

PREPARATION OF ELASTOMER CORE POLYMERS

A polybutadiene latex is produced by polymerizing butadiene at 70° C. to 98 percent conversion with a redox initiator. The latex has a solids content of 42% and a weight average particle size of 0.13 microns. To 200 parts by weight of the latex, there is rapidly added 1.1 part by weight of acetic anhydride mixed with 60 parts by weight of crushed ice, and the latex is stirred vigorously for about 15 seconds and allowed to stand undisturbed for 30 minutes. The agglomerated latex is then stabilized by slow and carefuul addition of 2 parts by weight of a mixture of mono- and di-phosphate esters of an alkylphenoxy polyethylene glycol containing about 9 ethylene oxide units per glycol molecule sold under the name Gafac ® R 610 by GAF Corporation. The emulsifier is added as a 10 percent aqueous solution adjusted to a pH of 12 by addition of sodium hydroxide solution. The agglomerated latex is stirred gently to distribute the surfactant uniformly on it. The agglomerated latex contains 29 percent rubber solids. The weight average particle size of the agglomerated latex is 0.5 micron.

Similarly, agglomerated polybutadiene latices with 0.29, 0.4 and 0.64 micron weight average particle sizes are prepared by adding 0.6, 0.8 and 1.2 parts of acetic anhydride to 200 parts by weight of polybutadiene latex.

PREPARATION OF MULTIPHASE CORE//SHELL POLYMERS

Agglomerated latex containing 100 parts by weight of polybutadiene of 0.5 micron weight average particle size is charged to a reaction kettle fitted with a temperature controller, two calibrated holding tanks (for monomer and persulfate solution additions), a baffle, a Teflon bladed agitator, and a condenser, and is diluted to about 20% solids with water. The batch is purged by bubbling nitrogen into it through a sparger for about 15–20 minutes while the batch is gently stirred and brought to 80° C.

A monomer mixture containing 30 parts by weight styrene 18 parts by weight acrylonitrile, 3 parts by weight monoethyl maleate and 0.75 parts by weight of terpinolene and an aqueous solution of potassium persulfate containing 0.90 parts of persulfate in 36 parts by weight of water, are prepared.

The monomer mixture and the persulfate solution are charged to the holding tanks and are also purged by bubbling nitrogen for about 5–10 minutes. A nitrogen atmosphere is maintained in the kettle and tanks throughout the course of polymerization.

When the kettle contents reach 80° C., about 10–15% of the monomer and initiator charge is added to the batch. The batch is stirred for about 15 minutes. At the end of this time, the continuous addition of the streams of monomer and catalyst is started. The rate of addition of the two streams is adjusted to complete the addition in about 4 hours. Polymerization at 80° C. is then continued for an additional hour. Monomer conversion is 95 percent. At the end of polymerization, the batch is filtered through cheesecloth. In general very little coagulum is obtained despite the fact that no additional emulsifier is charged during the course of polymerization. To the filtered latex is added an aqueous emulsion containing 25% by weight of mixed alkylated aryl phosphites sold by Uniroyal Corp. under the tradename Polygard ® and 12.5% by weight of 2,6-di-t-butyl-4-methylphenol sold by Shell Chemical Corp. under the tradename "Ionol." The amount added is designed to give 2 parts Polygard and 1 part Ionol per 100 parts of polybutadiene charged. The resulting stabilized latex is coagulated by adding it to a 3% aqueous solution of magnesium sulfate hexahydrate at 95°–98° C. A ratio of 2–3 volumes of magnesium sulfate solution for 1 volume of latex is used. The coagulated material is washed several times on a filter with cold, filtered water. Most of the water is removed by vacuum filtration or by centrifugation. The remaining water is removed at 60°–70° C. in a vacuum oven. Drying is continued until no sign of moisture can be detected in a dry ice/acetone trap.

The ratio of elastomer core to rigid shell is 1:0.6. The grafting efficiency is 28 percent. The intrinsic viscosity of the soluble fraction of the rigid shell is 0.32. The apparent melt viscosity of the multiphase polymer is 5.8 k-poise at 260° C. and a shear rate of $10^3$ sec.$^{-1}$. The example is designated Example I in Table 1. The apparent melt viscosity of polyamide 1 of table 2 under the same conditions is 1.5 k-poise.

Similarly by selection of polybutadiene latices of appropriate particle size, multiphase core//shell polymers of different core: shell ratios and different rigid polymer shell composition are prepared by the same process.

TABLE 1

| EXAMPLE | CORE DIAMETER MICRONS | CORE:SHELL WEIGHT RATIO | MULTIPHASE CORE//SHELL POLYMERS SHELL COMPOSITION % | | | | | | | | |
|---|---|---|---|---|---|---|---|---|---|---|---|
| | | | S | AN | MAME | MAMB | MAA | MMA | MA | BA | 2-EHA |
| I | .5 | 1:0.7 | 65 | 30 | 5 | — | — | — | — | — | — |
| II | .5 | 1:0.6 | 65 | 30 | 5 | — | — | — | — | — | — |
| III | .5 | 1:1.0 | 65 | 30 | 5 | — | — | — | — | — | — |
| IV | .5 | 1:1.4 | 65 | 30 | 5 | — | — | — | — | — | — |
| V | .5 | 1:1.8 | 65 | 30 | 5 | — | — | — | — | — | — |
| VI | .3 | 1:0.5 | 65 | 30 | 5 | — | — | — | — | — | — |
| VII | .3 | 1:0.8 | 65 | 30 | 5 | — | — | — | — | — | — |
| VIII | .3 | 1:1 | 65 | 30 | 5 | — | — | — | — | — | — |
| IX | .13 | 1:0.5 | 65 | 30 | 5 | — | — | — | — | — | — |
| X | .13 | 1:1 | 65 | 30 | 5 | — | — | — | — | — | — |
| XI | 0.5 | 1:0.7 | 65 | 30 | — | 5 | — | — | — | — | — |
| XII | 0.5 | 1:0.6 | 67 | 30 | 3 | — | — | — | — | — | — |
| XIII | 0.5 | 1:0.7 | 63 | 30 | 7 | — | — | — | — | — | — |
| XIV | 0.5 | 1:0.7 | 67 | 30 | — | — | 3 | — | — | — | — |
| XV | 0.5 | 1:1 | 65 | 30 | — | — | 5 | — | — | — | — |
| XVI | 0.72 | 1:0.5 | 65 | 30 | 5 | — | — | — | — | — | — |
| XVII | 0.54 | 1:0.5 | 60 | 30 | 10 | — | — | — | — | — | — |
| XVIII | 0.57 | 1:0.6 | 55 | 30 | 15 | — | — | — | — | — | — |
| XIX | 0.57 | 1:0.6 | 65 | 20 | 15 | — | — | — | — | — | — |
| XX | 0.57 | 1:0.5 | 65 | 20 | 15 | — | — | — | — | — | — |
| XXI | 0.44 | 1:0.5 | 60 | 20 | 20 | — | — | — | — | — | — |
| XXII | 0.44 | 1:0.5 | 55 | 20 | 25 | — | — | — | — | — | — |
| XXIII | 0.54 | 1:0.5 | 60 | 10 | 10 | — | — | — | 20 | — | — |
| XXIV | 0.4 | 1:0.6 | 60 | 10 | 10 | — | — | — | 20 | — | — |
| XXV | 0.72 | 1:0.5 | 60 | 10 | 10 | — | — | — | — | 20 | — |
| XXVI | 0.72 | 1:0.5 | 60 | 10 | 10 | — | — | — | — | — | 20 |
| XXVII | 0.46 | 1:0.5 | 60 | 10 | 10 | — | — | — | — | — | 20 |
| XXVIII | 0.45 | 1:0.5 | 60 | 10 | 10 | — | — | 20 | — | — | — |
| XXIX | 0.45 | 1:0.5 | 60 | — | 10 | — | — | 30 | — | — | — |
| XXX | 0.4 | 1:0.6 | 60 | — | 10 | — | — | — | 30 | — | — |
| XXXI | 0.53 | 1:0.5 | 50 | 20 | 10 | — | — | — | 20 | — | — |
| XXXII | 0.51 | 1:0.5 | 40 | 30 | 10 | — | — | 20 | — | — | — |

TABLE 1-continued

MULTIPHASE CORE//SHELL POLYMERS

| EXAMPLE | CORE DIAMETER MICRONS | CORE:SHELL WEIGHT RATIO | SHELL COMPOSITION % | | | | | | | | |
|---|---|---|---|---|---|---|---|---|---|---|---|
| | | | S | AN | MAME | MAMB | MAA | MMA | MA | BA | 2-EHA |
| XXXIII | 0.51 | 1:0.5 | 40 | 30 | 10 | — | — | — | 20 | — | — |
| XXXIV | 0.53 | 1:0.5 | 40 | 30 | 10 | — | — | — | 20 | — | — |
| XXXV | 0.5 | 1:0.7 | 70 | 30 | — | — | — | — | — | — | — |
| XXXVI | 0.5 | 1:1 | 70 | 30 | — | — | — | — | — | — | — |
| XXXVII | 0.5 | 1:1 | 100 | — | — | — | — | — | — | — | — |
| XXXVIII | 0.5 | 1:0.6 | 93 | — | 7 | — | — | — | — | — | — |
| XXXIX | 0.4 | 1:0.6 | — | — | 10 | — | — | 90 | — | — | — |

S = styrene,
AN = acrylonitrile,
MAME = monoethyl maleate,
MAMB = monobutyl maleate,
MAA = methacrylic acid,
MMA = methyl methacrylate,
MA = methyl acrylate,
BA = butyl acrylate,
2-EHA = ethylhexyl acrylate.

GRAFTING EFFICIENCY OF MULTIPHASE CORE//SHELL POLYMER

The grafting efficiency is determined by extracting from the polybutadiene graft the shell polymer which is not chemically attached or grafted thereto.

A portion of the latex obtained at the end of grafting (prior to the addition of the stabilizers) is coagulated in a large excess of acidulated methanol. The coagulum is washed several times with methanol on the filter and then dried at 60° C. The dry material is then pressed into a solid sheet in a mold heated to about 150° C. (Note: compression of the crumb into a sheet is needed in order to avoid colloidal dispersion of the rubber on extraction with acetone.)

The compressed sheet is cut into strips. A carefully determined weight of material (about 2 grams) is then placed in about 50 ml. of acetone for about 18-20 hrs. The clear acetone solution is syringed off and collected. This extraction operation is repeated once more and all the collected acetone solution is taken to dryness by solvent evaporation. The dry weight of the acetone soluble material (i.e., that portion of the shell polymer which is not grafted to the polybutadiene core) is thus obtained.

Since the total amount of shell polymer is known, the amount of grafted shell polymer in the pre-weighed molded strips is computed. The grafting efficiency is the ratio of the weight of shell polymer not extracted with acetone to the total weight of shell polymer present in the sample.

Grafting Efficiency $= (W - W_e)/W$ where W = the total weight of the shell in the sample and $W_e$ = the weight of shell polymer extracted The grafting efficiency is generally in the range of about 20 to 40 percent and increases with decreasing particle size of the polybutadiene core, decreasing ratio of shell to core and decreasing amount of chain transfer agent in the shell polymerization.

INTRINSIC VISCOSITY AND GLASS TRANSITION TEMPERATURE OF THE NON-GRAFTED PORTION OF MULTIPHASE CORE//SHELL POLYMER

Extraction of the shell polymer is conducted with DMF. The crumb obtained by coagulation with $MgSO_4$ is dried and molded into a sheet as described above. Strips are then leached in DMF; the solution, filtered through glass filter paper, is precipitated into acidulated 80 methanol/20 water. The precipitate is filtered, washed with methanol/water, and dried.

The intrinsic viscosity of the non-grafted shell polymer is determined in DMF at 25° C.

The glass transition temperature is determined on a duPont Differential Scanning Calorimeter, Model No. 900 with a sample size of about 0.1 to about 0.2 g. The heating rate is 20° C. per minute. The Tg is the midpoint of the glass transition deflection.

PREPARATION OF POLYAMIDE BLENDS

Blend components are carefully dried before extrusion. The polyamide in pellet form is dried at about 80° C. overnight at a pressure less than 1 torr. The multiphase core//shell polymer dried separately, is then mixed with the polyamide pellets by tumbling in a dry vessel at a temperature about 10° C. below the glass transition temperature of the rigid polymer shell and stored in sealed containers ready for use.

A single stage 2.54 cm. Killion extruder with a 2 stage (vent plugged) 24:1 screw at a screw speed of 100 rpm. is used for melt blending. A 40 mesh screen with a breaker plate is used at the nozzle of the extruder. For nylon 6,6 the set temperature profile for the various zones, from hopper to nozzle, is generally the following: 285, 282, 277, 266, 266° C.

The dry blend is charged to a nitrogen purged hopper and maintained under nitrogen during the course of extrusion. The extrudate is passed through a short section of water, through a stream of air and ground hot into a jar purged with nitrogen.

The extrudate is dried in vacuo at about 70° C. overnight. A second pass extrusion is then conducted. The extrudate, following this second pass, is again dried overnight at 70° C. in vacuo before molding.

A slightly rough extrudate is often obtained in the first extrusion, possibly due to uneven distribution of the bulky rubber in the hopper and/or incompletely dispersed rubber. A smooth extrudate is generally obtained on the second extrusion.

Molding of Blends

Injection molding is conducted in a ½ oz. Arburg machine. Typical molding conditions used for nylon 6,6 blends are:

| Top | Bottom | Nozzle | Mold |
|---|---|---|---|

-continued

| 271° C. | 266 | 266 | 66 |
|---|---|---|---|
| Injection Pressure | | 90–120 kPa | |
| Fill Time | | 2–4 Seconds | |
| Hold Time | | 15 Seconds | |
| Total Cycle | | 30–45 Seconds | |
| Screw Speed | | 250–350 RPM | |

Apparent melt viscosity of polyamide and core//shell polymer

The apparent melt viscosity of the polyamide and multiphase core//shell polymer components of a polyblend composition are determined in a Sieglaff-McKelvey Rheometer with a capillary length to diameter ratio of 10:1, at a temperature 10° C. above the melting point of the polyamide.

Mechanical Properties of Polyblends

Molded samples of the polyblends of polyamide and multiphase core//shell polymer are subjected to mechanical testing in the "dry-as-molded" state. The following tests are used:

Notched Izod toughness: ASTM D-256-56
Tensile Strength: ASTM D-638-58T
Elongation: ASTM D-638-58T
Tensile Modulus of the polymers: ASTM D-882
Particle Size: electron micrographs of microtomed molded specimens
Multiaxial Driven Dart Test is performed with a dart of 6.35 mm. diameter and a hemispherical head driven at a rate of 112 meters per minute.

The data for the polyblends are presented in Table 2. The matrix polyamides are nylon 6,6 and a nylon 6,6/nylon 6 copolymer in the ratio 85:15, of number average molecular weight 18000. These matrix polymers are designated polyamide 1 and polyamide 2 respectively in Table 2. Examples 1–43 are within the scope of the invention. Examples A–F are introduced for comparative purposes. Data for the polyamides show that the notched impact strength is quite low and that the impact resistance in the driven dart test is quite high, the frequency of brittle failure being significant, namely 10 percent. When the polyamides are blended with butadiene//styrene core//shell polymer (example A), and butadiene//styrene/acrylonitrile core//shell polymer (examples B, C and D) at best a modest improvement in notched impact strength is obtained but the frequency of brittle failure in the driven dart test is increased. When a carboxy monomer is introduced into the shell of a butadiene//styrene core//shell polymer some improvement in impact strength and reduction in brittle failure is observed (example F versus example A). Similarly with a core//shell polymer containing acid modified polymethyl methacrylate as the shell polymer a minor improvement in impact strength is observed (example F). In contrast when the shell comprises a carboxy monomer and styrene and acrylonitrile or an acrylate or methacrylate monomer or acrylonitrile and an acrylate or methacrylate monomer significant improvement in notched impact strength and elimination of brittle failure in the driven dart test are observed (examples 1 to 43).

Examples 4–7 provide a series of blends containing core//shell polymers of decreasing polybutadiene content. The notched impact strength decreases with decreasing butadiene content but in every case only ductile failure is observed in the driven dart test. The improvement in notched impact strength versus unblended polyamide is very pronounced when the butadiene content is above about 12 percent.

TABLE 2

| Example | Polyamide Matrix No. | Multiphase Core//Shell Polymer Example | Multiphase Core//Shell Polymer, % | Elastomer Core conc. % | Notched Impact J/m Notch. | IDI J [% brittle failure] | Tensile Strength mPa | Elong. (fail) % | Modulus MPa × 10⁻² |
|---|---|---|---|---|---|---|---|---|---|
| Polyamide 1 | — | — | 0 | 0 | 49 | 9.3 [87] | 64 | 16 | 34 |
| Polyamide 2 | — | — | 0 | 0 | 60 | 40 [10] | 48 | 100 | 27 |
| A | 2 | XXXVII | 30 | 15 | 43 | 1 [100] | 39 | 13 | — |
| B | 1 | XXXV | 30 | 17 | 136 | 26 | — | — | — |
| C | 2 | XXXV | 30 | 15 | 119 | 27 [20] | 46 | 45 | — |
| D | 2 | XXXVI | 20 | 10 | 76 | 5.9 [100] | 50 | 26 | — |
| E | 1 | XXXVIII | 30 | 20 | 266 | 51 | 46 | 185 | 16 |
| F | 2 | XXXIX | 30 | 19 | 201 | — | — | — | — |
| 1 | 1 | III | 30 | 15 | 456 | 34 | 53 | 52 | 21 |
| 2 | 1 | I | 30 | 18 | 380–980 | 34–47 | 46 | 58 | 19 |
| 3 | 1 | II | 30 | 20 | 916 | 48 | 46 | 78 | 18 |
| 4 | 2 | I | 30 | 18 | 810–920 | 34–57 [0] | 46 | 50 | — |
| 5 | 2 | III | 30 | 15 | 220–650 | 45 [0] | 43 | 40–70 | — |
| 6 | 2 | IV | 30 | 12 | 220–330 | 43–50 [0] | 49 | 40–80 | — |
| 7 | 2 | V | 30 | 10.7 | 206 | 50 [0] | 44 | 70–160 | — |
| 8 | 2 | I | 20 | 12 | 342 | 42' | 49 | 45 | 21 |
| 9 | 2 | VI | 22.5 | 15 | 163 | 47 [0] | 48 | 73 | — |
| 10 | 2 | VII | 27 | 15 | 597 | 40 [0] | 51 | 84 | — |
| 11 | 2 | VIII | 30 | 15 | 759 | 41 [0] | 51 | 83 | — |
| 12 | 2 | IX | 22.5 | 15 | 119 | 40 [0] | 47 | 40 | — |
| 13 | 2 | X | 30 | 15 | 228 | 47 [0] | 52 | 69 | — |
| 14 | 1 | XI | 30 | 18 | 732 | 44 | 48 | 63 | 20 |
| 15 | 1 | XII | 30 | 19 | 390 | 52 | 47 | 100 | 19 |
| 16 | 1 | XIII | 30 | 19 | 783 | 44 | 40 | 177 | 17 |
| 17 | 1 | XIV | 30 | 18 | 775 | 35 | 48 | 42 | 21 |
| 18 | 1 | XV | 30 | 15 | 239 | 47 | 48 | 52 | 20 |
| 19 | 2 | XVI | 35 | 23 | 531 | — | — | — | — |
| 20 | 2 | XVII | 30 | 20 | 786 | — | — | — | — |
| 21 | 2 | XVII | 35 | 23 | 835 | — | — | — | — |
| 22 | 2 | XVIII | 30 | 19 | 694 | — | — | — | — |
| 23 | 2 | XIX | 30 | 19 | 884 | — | — | — | — |
| 24 | 2 | XX | 30 | 20 | 803 | — | — | — | — |

TABLE 2-continued

| Example | Polyamide Matrix No. | Multiphase Core//Shell Polymer Example | Multiphase Core//Shell Polymer, % | Elastomer Core conc. % | Notched Impact J/m Notch. | IDI J [% brittle failure] | Tensile Strength mPa | Elong. (fail) % | Modulus MPa × $10^{-2}$ |
|---|---|---|---|---|---|---|---|---|---|
| 25 | 2 | XXI | 35 | 23 | 743 | — | — | — | — |
| 26 | 2 | XXII | 35 | 23 | 472 | — | — | — | — |
| 27 | 2 | XXIII | 30 | 20 | 873 | 51 | — | — | — |
| 28 | 2 | XXIII | 35 | 23 | 879 | 40 | — | — | — |
| 29 | 2 | XXIV | 30 | 19 | 900 | — | — | — | — |
| 30 | 2 | XXV | 30 | 20 | 895 | 42 | — | — | — |
| 31 | 2 | XXV | 35 | 23 | 900 | 44 | — | — | — |
| 32 | 2 | XXVI | 30 | 20 | 965 | 45 | — | — | — |
| 33 | 2 | XXVI | 35 | 23 | 916 | 40 | — | — | — |
| 34 | 2 | XXVII | 30 | 20 | 922 | — | — | — | — |
| 35 | 2 | XXVIII | 30 | 20 | 987 | 33 | — | — | — |
| 36 | 2 | XXVIII | 35 | 23 | 944 | 32 | — | — | — |
| 37 | 2 | XXIX | 30 | 20 | 906 | 31 | — | — | — |
| 38 | 2 | XXIX | 35 | 23 | 911 | 32 | — | — | — |
| 39 | 2 | XXX | 30 | 19 | 916 | — | — | — | — |
| 40 | 2 | XXXI | 30 | 20 | 808 | — | — | — | — |
| 41 | 2 | XXXII | 30 | 20 | 857 | — | — | — | — |
| 42 | 2 | XXXIII | 30 | 20 | 824 | — | — | — | — |
| 43 | 2 | XXXIV | 30 | 20 | 803 | — | — | — | — |

Examples 8–13 illustrate the effect of the ratio of elastomer core to rigid shell and the advantage of having sufficient hard shell around the soft core to protect the core and permit formation of a dispersion of the coagulated core//shell polymer with particles of size comparable to the size of the original polybutadiene core. Electron microscopy reveals that the polyblend of example 11 contains a uniform dispersion of particles of core//shell polymer of a size (about 0.3 micron) similar to the size of the original agglomerated polybutadiene latex. The polyblend has high impact strength. When the amount of rigid shell protecting the polybutadiene is reduced in examples 9 and 10, electron microscopy shows that the dispersion in the polyamide is much less complete and mechanical tests show reduction in the impact strength with reduction in the amount of rigid shell. Even at a 1:1 core:shell ratio, multiphase core//shell polymers prepared from polybutadiene latex of particle size 0.13 are not uniformly dispersed in polyamide, and the polyblends have low impact strength. (examples 12, 13). In contrast although the elastomer content of example 8 is substantially lower than the elastomer content of examples 12 and 13 the notched impact strength is substantially higher.

Example 14, 17 and 18 show that polyblends containing multiphase core//shell polymers in which acid monomers other than monoethyl maleate are incorporated into the rigid shell, also show improved toughness.

Examples 15, 16 and 19 to 26 contain core//shell polymers with shells comprising various amounts of interpolymerized acid monomer. The data suggest that an optimum acid concentration occurs in the range of about 5 to 15 weight percent corresponding to a concentration of carboxy groups in the range of about 1.6 to about 4.8 weight percent.

A further advantage of the core//shell modified polyamide compositions resides in their high impact strengths at low temperatures. Table 3 sets forth the data obtained at −40° C.

TABLE 3

| Example | Notched Impact J/m notch at −40° C. | IDI, J, −40° C. |
|---|---|---|
| Polyamide 2 | 49 | 6 to 76 |
| 19 | 141 | 49 |
| 20 | 190 | 30 |
| 21 | 233 | 49 |
| 22 | 201 | 49 |
| 23 | 233 | 45 |
| 24 | 179 | 48 |
| 25 | 168 | 44 |
| 26 | 136 | 35 |
| 27 | 190 | 61 |
| 28 | 201 | 53 |
| 30 | 152 | 56 |
| 31 | 141 | 63 |
| 32 | 168 | 63 |
| 33 | 206 | 63 |
| 35 | 125 | 35 |
| 36 | — | 32 |
| 37 | 108 | 19 |
| 38 | — | 31 |
| 40 | 146 | 73 |
| 41 | 184 | 55 |
| 42 | 195 | 55 |
| 43 | 184 | 57 |

GLASS FIBER COMPOSITES

Glass fiber composites are obtained by blending glass fiber with polyamide core//shell multiphase polymer blends at a concentration of 13 weight percent glass fiber based on the total weight of the composite. Data are presented in table 4 comparing polyamide 1 reinforced with glass fiber and a blend of polyamide 1 and core//shell polymer II reinforced with glass fiber. The composites containing core//shell polymer show greatly improved Izod toughness and improved elongation without significant sacrifice in tensile strength and resistance to heat distortion.

TABLE 4

| GLASS REINFORCED COMPOSITES | | | | | | | | |
|---|---|---|---|---|---|---|---|---|
| POLYAMIDE % | GLASS FIBER % | MULTIPHASE CORE//SHELL POLYMER, % | ELASTOMER CORE CONC. % | NOTCHED IMPACT, J/m notch. | TENSILE STRENGTH mPA | ELONG. % | MODULUS mPa × $10^{-2}$ | HDT, °C. 264 PSI |
| 75 | 13 | 12 | (8.1) | 130 | 97 | 3.7 | 43 | 219 |
| 70 | 13 | 17 | (11.6) | 152 | 85 | 3.8 | 41 | 223 |

TABLE 4-continued

| | | | GLASS REINFORCED COMPOSITES | | | | | |
|---|---|---|---|---|---|---|---|---|
| POLYAMIDE % | GLASS FIBER % | MULTIPHASE CORE//SHELL POLYMER, % | ELASTOMER CORE CONC. % | NOTCHED IMPACT, J/m notch. | TENSILE STRENGTH mPA | ELONG. % | MODULUS mPa × $10^{-2}$ | HDT, °C. 264 PSI |
| 87 | 13 | — | — | 54 | 103 | 2.5 | 48 | 245 |

I claim:

1. A multiphase core//shell polymer comprising about 50 to about 90 parts by weight of a crosslinked elastomer core and about 10 to about 50 parts by weight of a rigid thermoplastic polymer shell comprising from about 1 to about 25 parts by weight of an interpolymerized $C_1$ to $C_4$ monoalkyl maleate or fumarate, from about 20 to about 80 parts by weight of interpolymerized styrene, from about 0 to about 79 parts by weight of an interpolymerized $C_1$ to $C_8$ alkyl acrylate or methacrylate and from about 0 to about 45 parts by weight of interpolymerized acrylonitrile or methacrylonitrile based on 100 parts by weight of shell interpolymer, wherein the core of the multiphase core//shell polymer has a weight average particle diameter in the range of about 0.3 to about 0.8 micron and the rigid shell has a thickness of at least about 0.025 micron and wherein the glass transition temperature of the rigid thermoplastic polymer shell is at least about 35° C.

2. The multiphase core//shell polymer according to claim 1 comprising from about 60 to about 80 parts by weight of elastomer core and from about 20 to about 40 parts by weight of rigid shell.

3. The multiphase core//shell polymer according to claim 1 wherein the core of the multiphase polymer has a weight average particle diameter in the range of about 0.4 to about 0.7 micron.

4. The multiphase core//shell polymer according to claim 1, 2 or 3 wherein the elastomer core comprises interpolymerized butadiene.

* * * * *